(12) United States Patent
Jang (10) Patent No.: US 10,821,818 B2
(45) Date of Patent: Nov. 3, 2020

(54) CONTROL METHOD AND APPARATUS FOR MILD HYBRID ELECTRIC VEHICLE

(71) Applicants: Hyundai Motor Company, Seoul (KR); Kia Motors Corporation, Seoul (KR)

(72) Inventor: Hwa Yong Jang, Gyeonggi-do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 101 days.

(21) Appl. No.: 16/210,810

(22) Filed: Dec. 5, 2018

(65) Prior Publication Data
US 2020/0070642 A1 Mar. 5, 2020

(30) Foreign Application Priority Data
Aug. 29, 2018 (KR) .................. 10-2018-0101961

(51) Int. Cl.
| | |
|---|---|
| B60K 6/26 | (2007.10) |
| B60K 6/485 | (2007.10) |
| B60W 10/08 | (2006.01) |
| B60K 6/365 | (2007.10) |
| B60K 6/547 | (2007.10) |
| B60W 10/06 | (2006.01) |
| B60W 20/11 | (2016.01) |
| B60W 20/40 | (2016.01) |

(52) U.S. Cl.
CPC .............. B60K 6/26 (2013.01); B60K 6/485 (2013.01); B60W 10/08 (2013.01); *B60K 6/365* (2013.01); *B60K 6/547* (2013.01); *B60K 2006/268* (2013.01); *B60L 2240/423* (2013.01); *B60L 2240/441* (2013.01); *B60L 2240/486* (2013.01); *B60W 10/06* (2013.01); *B60W 20/11* (2016.01); *B60W 20/40* (2013.01); *B60W 2510/0638* (2013.01); *B60W 2510/0657* (2013.01); *B60W 2510/083* (2013.01)

(58) Field of Classification Search
CPC .................................. B60K 6/26; B60K 6/485
See application file for complete search history.

(56) References Cited

U.S. PATENT DOCUMENTS

| | | | |
|---|---|---|---|
| 8,157,035 B2 | 4/2012 | Whitney et al. | |
| 2009/0124450 A1* | 5/2009 | Silveri | B60K 6/442 477/5 |

* cited by examiner

*Primary Examiner* — Anne Marie Antonucci
*Assistant Examiner* — Abdalla A Khaled
(74) *Attorney, Agent, or Firm* — Mintz Levin Cohn Ferris Glovsky and Popeo, P.C.; Peter F. Corless (57) ABSTRACT

A control method for a mild type hybrid electric vehicle is provided. The method determining whether a coasting condition is satisfied and initiating coasting when the coasting condition is satisfied. A reacceleration intention is then detected and a torque of a mild hybrid starter & generator (MHSG) is increased in response thereto. A revolutions per minute (RPM) of the MHSG is compared with a RPM of an engine an engagement of the MHSG with the engine is attempted when the RPM of the MHSG corresponds to the RPM of the engine. The RPM of the MHSG is then synchronized with the RPM of the engine. When the MHSG is successfully engaged with the engine, the torque of the MHSG is increased to inject a fuel to the engine.

20 Claims, 7 Drawing Sheets

CONTROL METHOD AND APPARATUS FOR MILD HYBRID ELECTRIC VEHICLE

CROSS-REFERENCE TO RELATED APPLICATION

The present application claims under 35 U.S.C. § 119(a) the benefit of Korean Patent Application No. 10-2018-0101961, filed on Aug. 29, 2018, the entire contents of which are incorporated by reference herein.

BACKGROUND

(a) Field of the Invention

The present invention relates to a control method of a mild hybrid electric vehicle and a control apparatus thereof and more particularly, to a control method and apparatus that prevent a rapid variation in revolutions per minute during a reacceleration of a mild hybrid electric vehicle.

(b) Description of the Related Art

As generally known in the art, a hybrid electric vehicle uses an internal combustion engine and a battery power supply together. In other words, the hybrid electric vehicle uses an efficient combination of power of an internal combustion engine and power of a motor. The hybrid electric vehicle may be classified as a mild type and a full type according to a division ratio of power of an engine and power of the motor. The mild type hybrid electric vehicle includes a mild hybrid starter & generator (MHSG) that starts an engine instead of an alternator or generates electricity by an output of the engine. The full type hybrid electric vehicle separately includes an integrated starter-generator that starts an engine or generates electricity by an output of the engine and a drive motor that drives the vehicle.

The mild type hybrid electric vehicle may assist an engine torque according to a running state using the MHSG, and may charge a battery (e.g., 48 V battery) through regenerative braking. Accordingly, fuel consumption of the mild type hybrid electric vehicle may be improved. In the mild type hybrid electric vehicle, a main method of reducing fuel consumption turns-off an engine by injecting a minimal amount of a fuel during coasting. In a vehicle using an electronic clutch (E-clutch), an engine, a transmission, and a vehicle drive shaft are separated from each other to additional reduce a frictional force to improve a coasting function. However, a when a driver reaccelerates during a coasting, an engine revolutions per minute (RPM) is rapidly varied due to rapid engagement between the MHSG and the engine causing the driver to feel unnecessary heterogeneity, discomfort, and anxiety.

The above information disclosed in this section is merely for enhancement of understanding of the background of the invention and therefore it may contain information that does not form the prior art that is already known in this country to a person of ordinary skill in the art.

SUMMARY

The present invention provides a control method and apparatus for a mild type hybrid electric vehicle having advantages of increasing an engine RPM without rapid variation thereof during a reacceleration process to provide a more stable and convenient running feeling to a driver by synchronizing an RPM of an MHSG and an RPM of an engine for a constant period of time before reacceleration after completion of the engagement of the MHSG with the engine when attempting reacceleration during coasting.

An exemplary embodiment of the present invention provides a control method for a mild type hybrid electric vehicle that may include: determining whether a coasting condition is satisfied; starting a coasting when the coasting condition is satisfied; detecting a reacceleration intention; increasing a torque of a mild hybrid starter & generator (MHSG) when the reacceleration intention is detected; comparing a revolutions per minute (RPM) of the MHSG with an RPM of an engine; attempting an engagement of the MHSG with the engine when the RPM of the MHSG corresponds to the RPM of the engine; synchronizing the RPM of the MHSG with the RPM of the engine; determining whether the MHSG is successfully engaged with the engine; and increasing the torque of the MHSG to inject a fuel to the engine when the MHSG is successfully engaged with the engine.

The synchronizing of the RPM of the MHSG with the RPM of the engine may include adjusting the torque of the MHSG for a predetermined period of time so that the RPM of the MHSG is the same as the RPM of the engine as the RPM of the engine is reduced during coasting. The control method for a mild type hybrid electric vehicle may further include adjusting the torque of the MHSG so that the RPM of the MHSG becomes the RPM of the engine when the engagement of the MHSG with the engine fails, wherein when the RPM of the MHSG corresponds to the RPM of the engine, the attempting of the engagement of the MHSG with the engine may be repeated.

The control method for a mild type hybrid electric vehicle may further include comparing the RPM of the engine with a predetermined RPM when the reacceleration intention is confirmed, wherein the increasing of the torque of the MHSG may be performed when the RPM of the engine is less than the predetermined RPM. The control method may also include starting to inject the fuel to the engine so that a variation rate of the RPM of the engine is less than or equal to a predetermined variation rate when the RPM of the engine is equal to or greater than the predetermined RPM.

The synchronizing of the RPM of the MHSG with the RPM of the engine may include: adjusting the torque of the MHSG for a predetermined time so that the RPM of the MHSG is the same as the RPM of the engine when the variation rate of the RPM of the engine is less than or equal to the predetermined variation rate due to the injection of the fuel. The control method for a mild type hybrid electric vehicle may further include: when the engagement of the MHSG with the engine fails, stopping the injection of the fuel to the engine; and adjusting the torque of the MHSG so that the RPM of the MHSG becomes the RPM of the engine, wherein when the RPM of the MHSG corresponds to the RPM of the engine, the attempting of the engagement of the MHSG with the engine may be repeated.

Additionally, the synchronizing of the RPM of the MHSG with the RPM of the engine may include: adjusting the torque of the MHSG for a predetermined period of time so that the RPM of the MHSG is the same as the RPM of the engine when the RPM of the engine is reduced during coasting. Whether the coasting condition is satisfied may be determined based on at least one of a position value of an accelerator pedal, a position value of a brake pedal, a speed of the vehicle, and a gradient of a road, and the starting of the coasting may include: turning-off the engine; and separating the engine and a transmission from a vehicle drive shaft clutch. A reacceleration intention may be detected based on a position value of an accelerator pedal and a position value of a shift lever.

Another exemplary embodiment of the present invention provides, a control apparatus for a mild type hybrid electric vehicle that may include: an engine configured to combust a fuel and air; a mild hybrid starter & generator (MHSG) configured to start the engine, generate electricity by an output of the engine, or assist a torque of the engine; a data detector configured to detect data control of the engine and the MHSG; and a controller configured to operate the engine and the MHSG according to the data from the data detector. In particular, the controller may be configured to initiate a coasting when the coasting condition is satisfied, increase a torque of the MHSG when the reacceleration intention is confirmed to attempt an engagement of the MHSG with the engine when the RPM of the MHSG corresponds to the RPM of the engine, and increase the torque of the MHSG to inject a fuel to the engine when the MHSG is successfully engaged with the engine.

After the engagement of the MHSG with the engine is attempted, the controller may be configured to adjust the torque of the MHSG for a predetermined period of time so that the RPM of the MHSG is the same as the RPM of the engine when the RPM of the engine is reduced during a coasting, and the controller may be configured to determine whether the MHSG is successfully engaged with the engine after the predetermined period of time elapses. The controller may also be configured to adjust the torque of the MHSG so that the RPM of the MHSG becomes the RPM of the engine when the engagement of the MHSG with the engine fails, and again attempt the engagement of the MHSG with the engine.

Further, the controller may be configured to compare the RPM of the engine with a predetermined RPM when the reacceleration intention is confirmed during the coasting, and increase the torque of the MHSG when the RPM of the engine is less than or equal to the predetermined RPM to attempt the engagement of the MHSG with the engine after the RPM of the MHSG corresponds to the RPM of the engine. The controller may be configured to initiate the injection of the fuel to the engine so that a variation rate of the RPM of the engine is less than or equal to a predetermined variation rate when the RPM of the engine is equal to or greater than the predetermined RPM, and increase the torque of the MHSG to attempt the engagement of the MHSG with the engine after the RPM of the MHSG corresponds to the RPM of the engine.

The controller may be configured to adjust the torque of the MHSG for a predetermined period of time so that the RPM of the MHSG is the same as the RPM of the engine when the variation rate of the RPM of the engine is less than or equal to the predetermined variation rate due to the injection of the fuel. The controller may then be configured to stop the injection of the fuel to the engine when the engagement of the MHSG with the engine fails, adjust the torque of the MHSG so that the RPM of the MHSG becomes the RPM of the engine, and attempt the engagement of the MHSG with the engine.

Additionally, the controller may be configured to adjust the torque of the MHSG for a predetermined time so that the RPM of the MHSG is the same as the RPM of the engine when the RPM of the engine is reduced during a coasting after attempting the engagement of the MHSG with the engine. The controller may be configured to determine whether the coasting condition is satisfied based on at least one of a position value of an accelerator pedal, a position value of a brake pedal, a speed of the vehicle, and a gradient of a road, and turn-off the engine when the coasting condition is satisfied, and may be configured to separate the engine and a transmission from a vehicle drive shaft clutch to start the coasting. The controller may also be configured to detect a reacceleration intention based on a position value of an accelerator pedal and a position value of a shift lever.

As described above, an exemplary embodiment of the present invention may increase an engine RPM to avoid a rapid variation thereof during a reacceleration process of a mild hybrid electric vehicle to provide more stable and convenient running feeling to a driver and improve reliability of the vehicle.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

The present invention will be described more fully hereinafter with reference to the accompanying drawings, in which exemplary embodiments of the invention are shown. However, the present invention may be modified in various different ways, not limited to the exemplary embodiments described herein. The drawings and description are to be regarded as illustrative in nature and not restrictive. Like reference numerals designate like elements throughout the specification. Further, each configuration shown in the drawings are optionally illustrated for better understanding and ease of description, the present invention is not limited to shown drawings.

Figure 1:
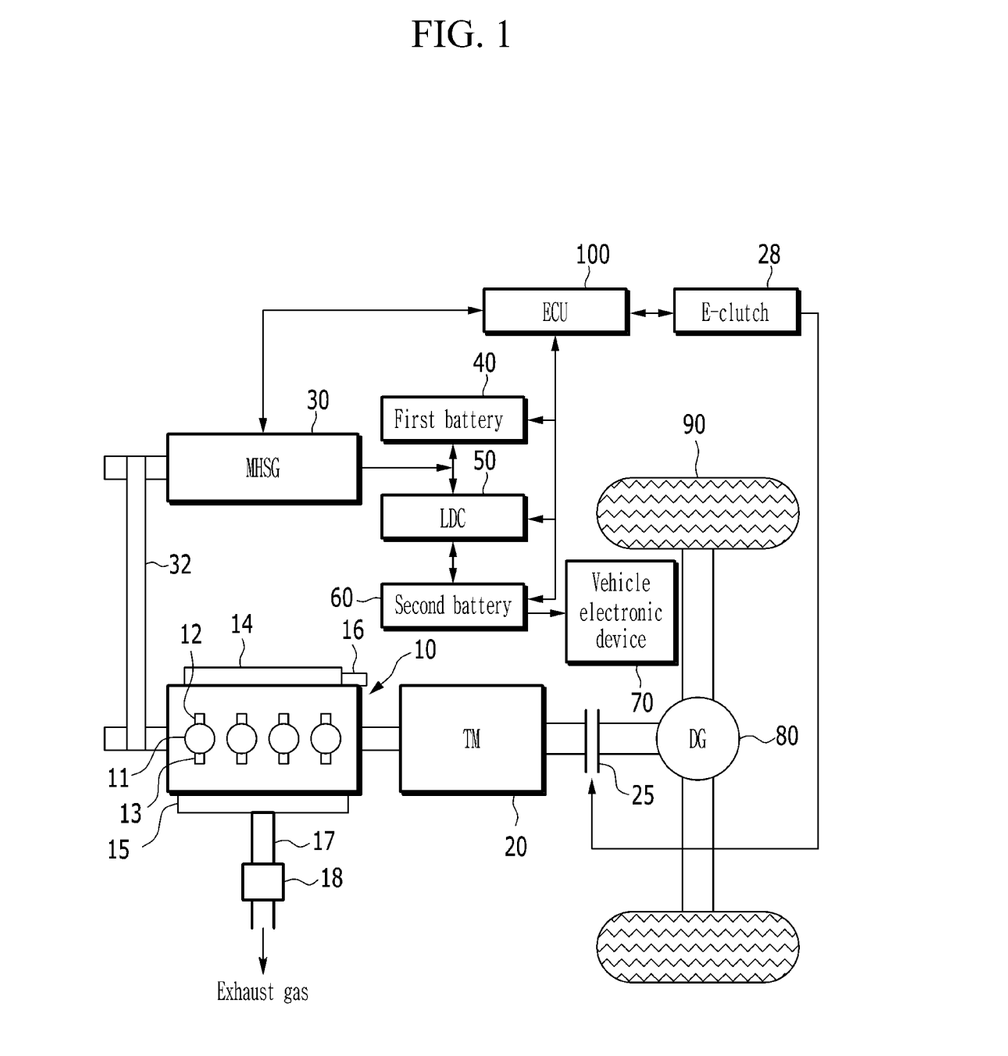
FIG. 1 is a block diagram schematically illustrating a mild type hybrid electric vehicle according to an exemplary embodiment of the present invention.
Figure 2:
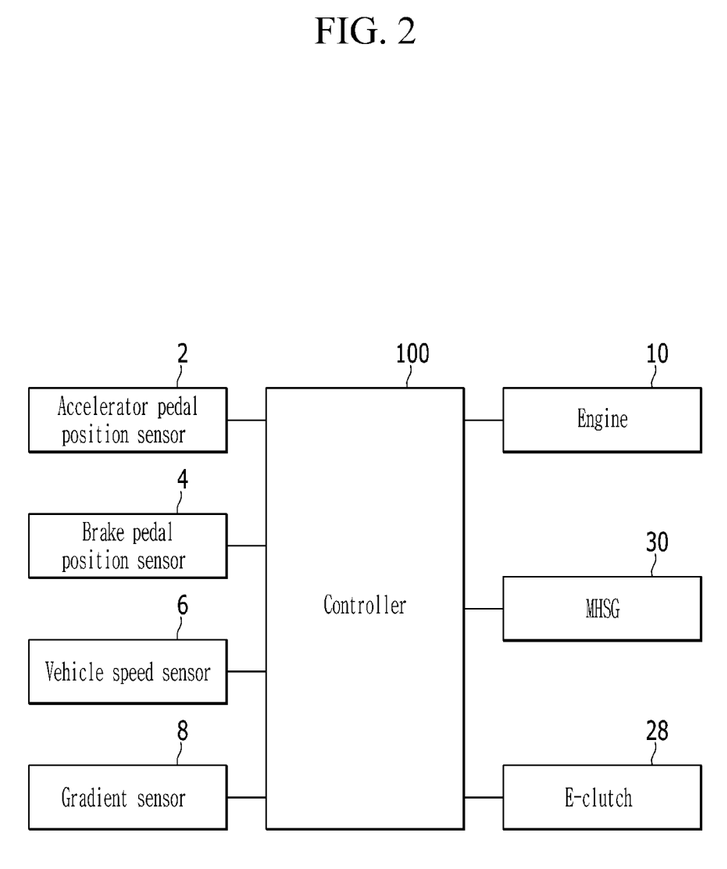
FIG. 2 is a block diagram schematically illustrating a control apparatus of a mild type hybrid electric vehicle according to an exemplary embodiment of the present invention.

Hereinafter, referring to FIG. 1 and FIG. 2, a mild hybrid electric vehicle and a control apparatus of the mild hybrid electric vehicle according to an exemplary embodiment of the present invention are described. FIG. 1 is a block diagram schematically illustrating a mild type hybrid electric vehicle according to an exemplary embodiment of the present invention, and FIG. 2 is a block diagram schematically illustrating a control apparatus of a mild type hybrid electric vehicle according to an exemplary embodiment of the present invention. As shown in FIG. 1, a mild type hybrid electric vehicle according to an exemplary embodiment of the present invention may include an engine 10, transmission 20, a mild hybrid starter & generator (MHSG) 30, a first battery 40, a differential gear device 80, and a wheel 90.

The engine 10 combusts a fuel and air to convert chemical energy into mechanical energy. In power transmission of the hybrid electric vehicle, a torque of the engine 10 is transmitted to an input shaft of the transmission 20, and a torque output from an output shaft of the transmission 20 is transmitted to a vehicle shaft through the differential gear device 80. The vehicle shaft rotates the wheel 90 to drive the mild type hybrid electric vehicle by the torque of the engine 10. The MHSG 30 converts electrical energy into mechanical energy or converts the mechanical energy into the electrical energy. In other words, the MHSG 30 may be configured to start the engine 10 or generate electricity an output of the engine 10. Further, the MHSG 30 may assist the torque of the engine 10 (e.g., provide auxiliary power). In other words, the mild hybrid electric vehicle may use a combustion torque of the engine 10 as primary power while using the torque of the MHSG 30 as auxiliary power. The engine 10 may be connected with the MHSG 30 via a belt 32.

The first battery 40 may be configured to supply electricity to the MHSG 30 or may be charged through electricity restored through the MHSG 30 in a regenerative braking mode. The first battery 40 may include a 48V battery. The mild hybrid electric vehicle may further include a low voltage direct current-direct current (DC-DC) converter (LDC) 50 configured to convert a voltage supplied from the first battery 40 into a low voltage and a second battery 60 configured to supply a low voltage to a vehicle electronic device 70 using the low voltage. The second battery 60 may include a 12V battery.

The engine 10 may include a plurality of combustion chambers 11 in which a fuel and air are introduced, an ignition device 12 configured to ignite the fuel and the air introduced into the combustion chamber 11, and an injector 13 configured to inject the fuel. The engine 10 may be connected with an intake manifold 14 and may be configured to receive the air in a combustion chamber 11, and collect exhaust gas generated during a combustion process in an exhaust manifold 15 to exhaust the exhaust gas to an outside of the engine 10. The injector 13 may be mounted in the combustion chamber 11 or at the intake manifold 14. A throttle valve 16 may be disposed at an intake line which is configured to supply the air into the intake manifold 14. A flow of air to be supplied to the intake manifold 14 may be adjusted based on an opening rate of the throttle valve 16. An exhaust pipe 17 may be connected with the exhaust manifold 15 and may be configured to discharge exhaust gas to an outside of the vehicle. A catalyst 18 may be filled in the exhaust pipe 17 to remove hydrocarbon, carbon monoxide and nitrogen oxide included in the exhaust gas.

As shown in FIG. 2, the control apparatus of a hybrid electric vehicle according to an exemplary embodiment of the present invention may include an accelerator pedal position sensor 2, a brake pedal position sensor 4, a vehicle speed sensor 6, a gradient sensor 8, an E-clutch 28, and a controller 100.

The accelerator pedal position sensor 2 may be configured to measure a position value of an accelerator pedal to transfer a corresponding signal to the controller 100. For example, when the accelerator pedal is completely pushed or engaged, the position value of the accelerator pedal may be expressed as 100%. When the accelerator pedal is disengaged, the position value of the accelerator pedal may be expressed as 0%. The brake pedal position sensor 4 may be configured to measure a position value of a brake pedal to transfer a corresponding signal to the controller 100. For example, when the brake pedal is completely pushed or engaged, the position value of the brake pedal may be expressed as 100%. When the brake pedal is disengaged, the position value of the brake pedal may be expressed as 0%.

The vehicle speed sensor 6 may be configured to measure a speed of the mild hybrid electric vehicle to transfer a corresponding signal to the controller 100. The gradient sensor 8 may be configured to measure a gradient of a road to transfer a corresponding signal to the controller 100. The E-clutch 28 may connect or separate the engine 10 and the transmission 20 with or from a vehicle drive shaft clutch 25. The controller 100 may then be configured to compare revolutions per minute (RPM) of the engine 10 with RPM of MHSG 30 to adjust a torque of the MHSG 30 based on the comparison result and to attempt engagement between the MHSG 30 and the engine 10 and reacceleration of the vehicle. The controller 80 may at least one processor operated by a predetermined program, and the predetermined program may include a series of commands to perform respective steps included in a control method of a mild type hybrid electric vehicle according to an exemplary embodiment of the present invention.

Figure 3:
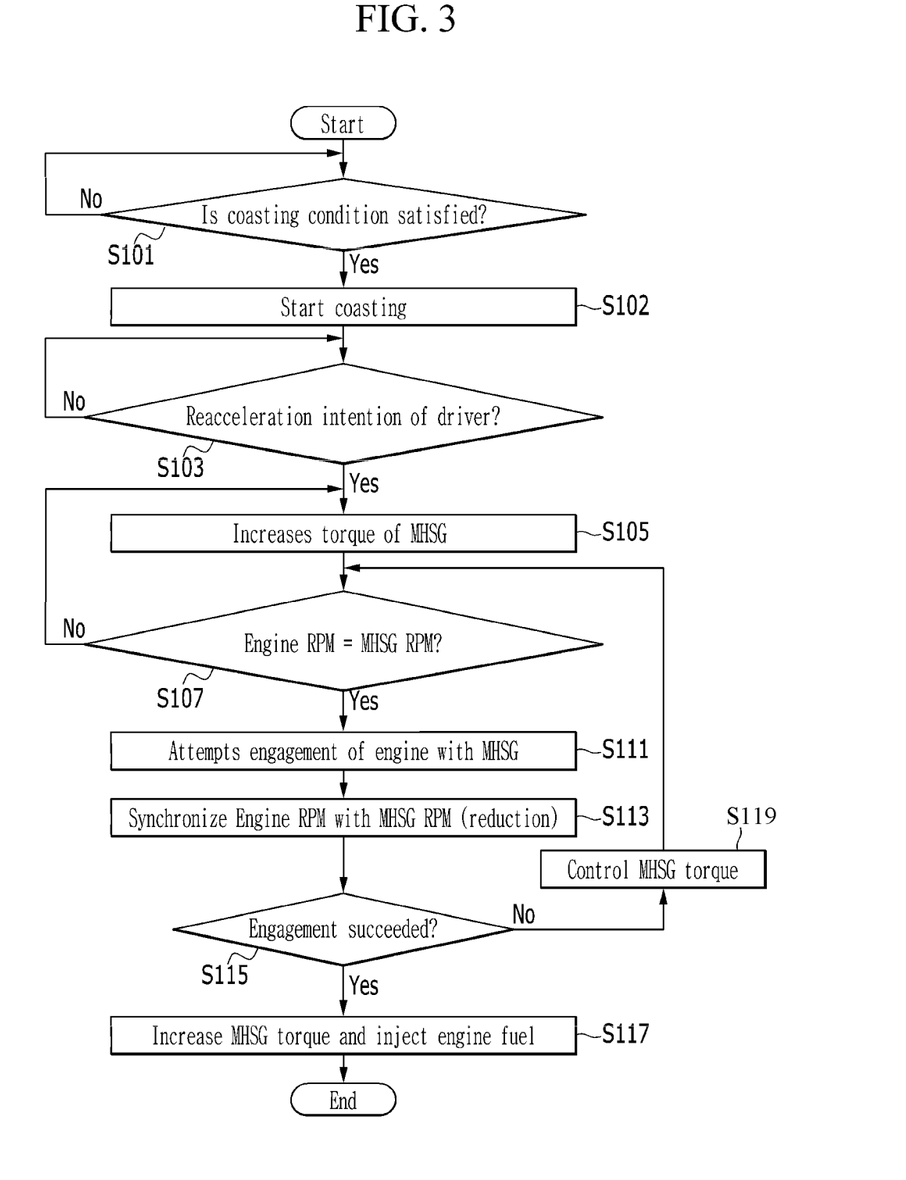
FIG. 3 is a flowchart schematically illustrating a control method of a mild type hybrid electric vehicle according to an exemplary embodiment of the present invention.
Figure 4A:
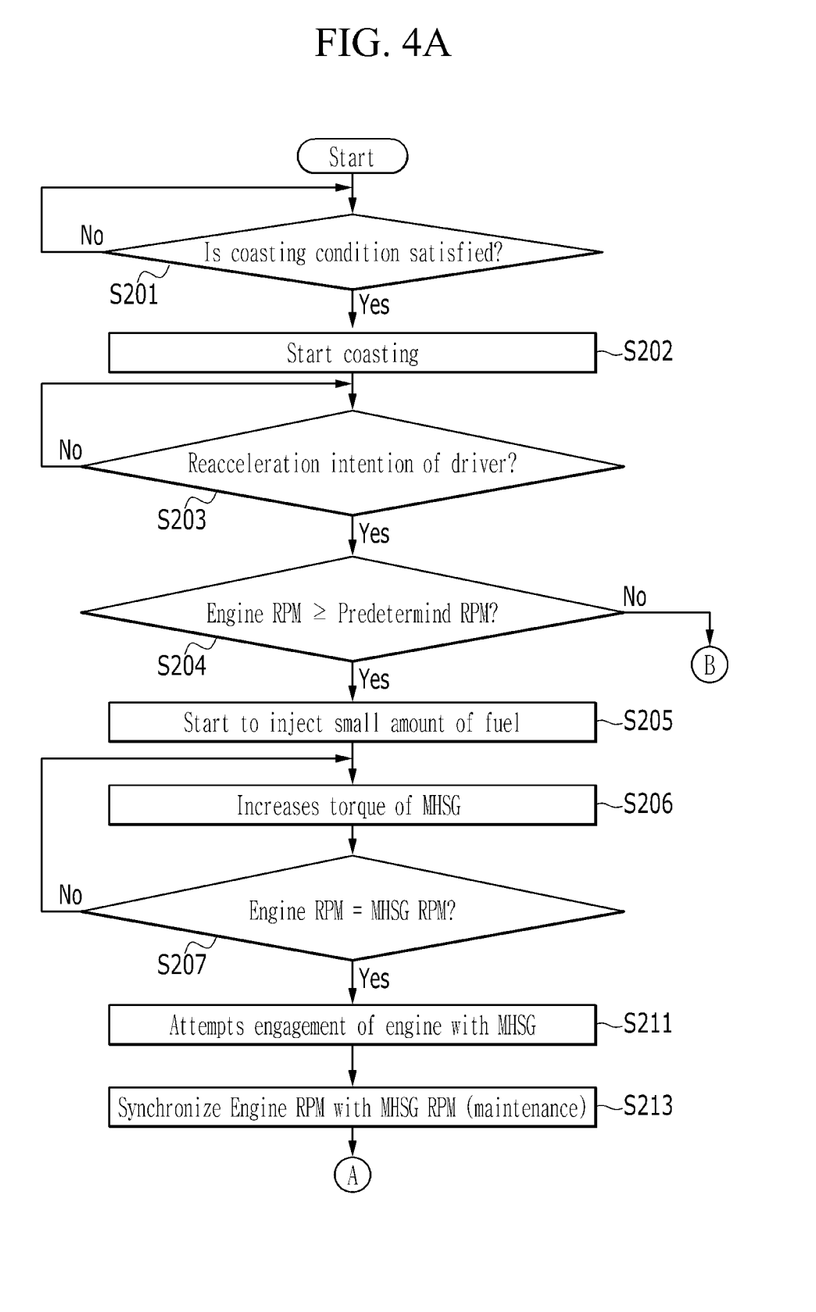
FIG. 4A and FIG. 4B are flowcharts schematically illustrating a control method of a mild type hybrid electric vehicle according to an exemplary embodiment of the present invention.
Figure 4B:
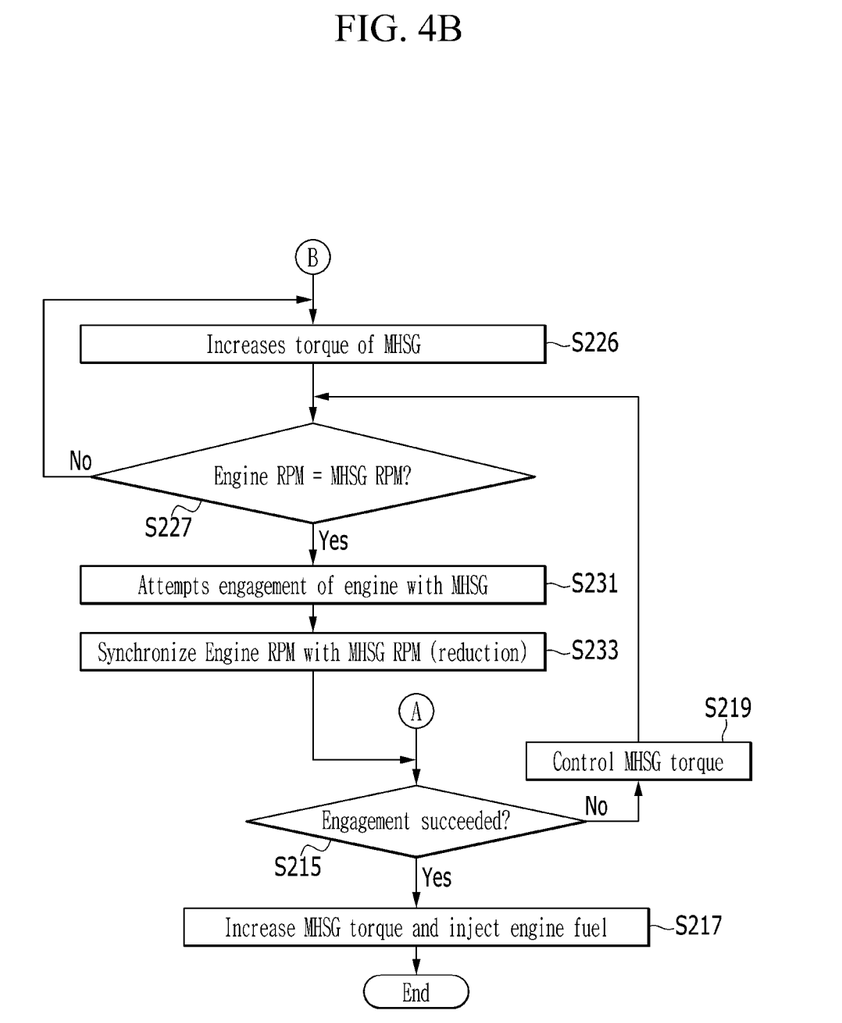

FIG. 3 and FIGS. 4A-4B are flowcharts schematically illustrating a control method of a mild type hybrid electric vehicle according to an exemplary embodiment of the present invention, respectively. Hereinafter, referring to FIG. 3, the control method of a mild type hybrid electric vehicle according to an exemplary embodiment of the present invention is described. The method described herein below may be executed by the controller.

Referring to FIG. 3, a controller 100 may be configured to determine whether a coasting condition is satisfied (S101). In particular, the controller 100 may be configured to determine whether a coasting condition is satisfied based on at least one of a position value of the accelerator pedal, a position value of the brake pedal, speed of the vehicle, and a gradient of a road. For example, the coasting condition may be satisfied when the position value of the accelerator pedal is less than or equal to a first predetermined position value (e.g., 0%), the position value of the brake pedal is less than or equal to a second predetermined position value (e.g., 0%), the speed of the vehicle is equal to or greater than a first predetermined speed (e.g., about 30 KPH), and the gradient of the road is in a predetermined gradient range (e.g., about −4% to 4%).

When the coasting condition is satisfied, the controller 100 may be configured to operate the vehicle to start the coasting (S102). Accordingly, the controller 100 may be configured to turn-off the engine 10, and separate the engine 10 and the transmission 20 from the vehicle drive shaft clutch 25. The controller 100 may then be configured to detect a reacceleration intention (S103). The reacceleration intention of the driver may be determined based on the position value of the accelerator pedal and a position value of a shift lever. For example, when the position value of the accelerator pedal is equal to or greater than a third predetermined position value (e.g., about 2%), and the shift lever is located at a drive (D) stage, the controller may be configured to detect the reacceleration intention.

When the reacceleration intention of the driver is confirmed, the controller 100 may be configured to increase a torque of the MHSG 30 (S105). The torque of the MHSG 30 may be increased until the RPM of the MHSG 30 is increased to the RPM of the engine 10. When the RPM of the MHSG 30 is increased to the RPM of the engine 10 (S107), the controller 100 may attempt engagement of the engine 10 with the MHSG 30 (S111). Thereafter, the controller 100 may be configured to adjust the torque of the MHSG to synchronize the RPM of the MHSG 30 with the RPM of the engine 10 for a predetermined period of time (S113). The predetermined period of time may be set as a value determined by those of ordinary skill in the art which is necessary to make the engagement between an engine and a MHSG is succeeded during a coasting to be finished before the drivers feel discomfort or anxiety because of too long time taken for the reacceleration. For example, the predetermined period of time may be about 5 seconds.

In general, the RPM of the engine of the mild hybrid electric vehicle during a coasting may be gradually reduced. In other words, as the RPM of the engine 10 is gradually reduced in step S113, the controller 100 may be configured to adjust the torque of the MHSG 30 for the predetermined period of time so that the RPM of the MHSG 30 has the same value as the torque of the MHSG 30 to be reduced.

In the related art, when the reacceleration intention of the driver is confirmed during the coasting, engagement between the MHSG and the engine and reacceleration are performed without synchronization, the engine RPM is rapidly varied during the reacceleration thus causing the driver to feel unnecessary heterogeneity, discomfort, and anxiety.

In an exemplary embodiment of the present invention, when the reacceleration intention of the driver is confirmed during the coasting, the controller 100 may attempt engagement between the MHSG 30 and the engine 10 to assist the torque of the engine 10 by the MHSG 30, and synchronize the RPM of the MHSG 30 with the RPM of the engine 10 for a predetermined period of time so that the engine RPM may be increased while avoiding a rapidly RPM variation during the reacceleration to thus provide a more stable and convenient running feeling to the driver. Further, since the engagement between the MHSG 30 and the engine 10 may be performed while maintaining the synchronization of the MHSG 30 with the engine 10, the engagement may be performed more easily.

Then, the controller 100 may be configured to determine whether the MHSG 30 is successfully engaged with the engine 10 (S115). To this end, the controller 100 increases the torque of the MHSG 30 and monitors the variation aspect of the RPM of the engine 10. If the variation value of the RPM of the engine 10 is equal to or greater than a predetermined variation value, the controller 100 may be configured to determine the MHSG 30 to be successfully engaged with the engine 10. The predetermined variation value may be set as a value determined by those of ordinary skill in the art which is necessary to check whether the engagement between an engine and a MHSG is succeeded during a coasting. For example, the predetermined variation value may be about 200 RPM.

When the MHSG 30 is successfully engaged with the engine 10 (S115), the controller 100 may be configured to increase the torque of the MHSG 30 and inject a fuel to the engine 10 (S117). Accordingly, the reacceleration of the vehicle may be performed, and the torque of the MHSG 30 may reach a desired torque of the driver by combustion of the engine 10 and the torque assistant of the MHSG 30. When the engagement between the MHSG 30 and the engine 10 fails (S115), the controller 100 may be configured to adjust the torque of the MHSG 30 so that the RPM of the MHSG 30 becomes the RPM of the engine 10 (S119). When the RPM of the MHSG corresponds to the RPM of the engine 10 (S107), the controller 100 may reattempt the engagement of the MHSG 30 with the engine 10 (S111). Accordingly, in an exemplary embodiment of the present invention, when the engagement of the MHSG with the engine fails, resynchronization and reengagement may be performed to improve stability and reliability of the control.

Hereinafter, referring to FIGS. 4A and 4B, a control method of the mild hybrid electric vehicle according to an exemplary embodiment of the present invention is described. The repetition in the description of FIG. 3 will be omitted. Referring to FIG. 4A and FIG. 4B, the controller 100 may be configured to determine whether a coasting condition is satisfied (S201). When the coasting condition is satisfied, the controller 100 may be configured to operate a vehicle to start the coasting (S202).

When a reacceleration intention of a driver is detected during the coasting (S203), the controller 100 may be configured to compare a RPM of the engine 10 with a predetermined RPM (S204). In particular, the predetermined RPM may be determined as a value capable of inducing explosion when those of ordinary skill in the art inject a fuel to the engine during a coasting. For example, the predetermined RPM may be about 800 RPM. When the RPM of the engine 10 is less than the predetermined RPM, referring to FIG. 3, similar to an exemplary embodiment of the present invention, the controller 100 may be configured to increase a torque of the MHSG 30 (S226); attempt engagement of the engine 10 with the MHSG 30 when a RPM of the engine 10 corresponds to a RPM of the MHSG 30 (S231); synchronize the RPM of the engine 10 with the RPM of the MHSG 30 so that the RPM of the MHSG 30 is reduced as the RPM of the engine 10 is reduced (S233); and increase the torque of the MHSG 30 and inject a fuel to the engine 10 to reaccelerate the vehicle when engagement of the engine 10 with the MHSG 30 succeeds (S217).

When the RPM of the engine 10 is equal to or greater than the predetermined RPM, the controller 100 may be configured to initiate injection of a minimal amount of a fuel to the engine to adjust a variation rate of the RPM of the engine 10 to be less than or equal to a predetermined variation rate (S205). The predetermined variation rate may be set as a value determined by those of ordinary skill in the art which is necessary to make the engagement between an engine and a MHSG during a coasting to be difficult to be felt by drivers. In general, the RPM of the engine of the mild hybrid electric vehicle during a coasting may be gradually reduced. However, when the reacceleration intention of the driver is detected, the RPM of the engine may be maintained in a constant range by injecting a minimal amount of the fuel to the engine. Here, the minimal amount' may be set as a value determined by those of ordinary skill in the art which is necessary to maintain the engine RPM of a mild type hybrid electric vehicle during a coasting in a constant range not to be reduced or increased.

Furthermore, the controller 100 may be configured to increase the torque of the MHSG 30 so that the RPM of the MHSG 30 is increased to the RPM of the engine 10 (S207). When the RPM of the MHSG 30 is increased to the RPM of the engine 10 (S207), the controller 100 may attempt the engagement of the MHSG 30 with the engine 10 (S211). Then, the controller 100 may be configured to increase the torque of the MHSG to synchronize the RPM of the MHSG with the RPM of the engine for a predetermined period of time (S213). The predetermined period of time may be set as a value determined by those of ordinary skill in the art which is necessary to make the engagement between an engine and a MHSG is succeeded during a coasting to be finished before the drivers feel discomfort or anxiety because of too long time taken for the reacceleration. For example, the predetermined period of time may be about 1 second.

Particularly, since a minimal amount of the fuel is injected to the engine 10 so that the RPM of the engine 10 is maintained in a constant range, the controller 100 may be configured to adjust the torque of the MHSG 30 for a predetermined period of time so that the RPM of the MHSG 30 is the same as that of the engine 10 to be maintained in a constant range at step S213. When a predetermined period of time elapses, the controller 100 may be configured to determine whether the MHSG 30 is successfully engaged with the engine 10 (S215).

In an exemplary embodiment of the present invention, when the engagement of the MHSG 30 with the engine 10 is attempted, a more stable and convenient running feeling may be provided to the driver and the MHSG 30 may be more easily engaged with the engine 10 by synchronizing the RPM of the MHSG 30 with the RPM of the engine 10 for a predetermined period of time. In particular, an exemplary embodiment of the present invention may provide stable engagement and restart at a higher RPM area by maintaining the RPM of the engine within a predetermined range through injection of a minimal amount of a fuel.

When the MHSG 30 is successfully engaged with the engine 10 (S215), the controller 100 may be configured to increase the torque of the MHSG 30 and inject the fuel to the engine 10 (S219). Accordingly, the reacceleration of the vehicle may be achieved, and the torque of the MHSG 30 may become a desired torque of the driver by combustion of the engine 10 and the torque assistant of the MHSG 30. When the engagement between the MHSG 30 and the engine 10 fails (S215), the controller 100 may be configured to stop injection of the fuel and adjust the torque of the MHSG 30 so that the RPM of the MHSG 30 becomes the RPM of the engine 10 (S219). When the RPM of the MHSG corresponds to the RPM of the engine 10 (S227), the controller 100 may reattempt the engagement of the MHSG 30 with the engine 10 (S231). Accordingly, when the engagement of the MHSG 30 with the engine 10 fails, resynchronization and reengagement may be performed to improve stability and reliability of the control.

Figure 5A:
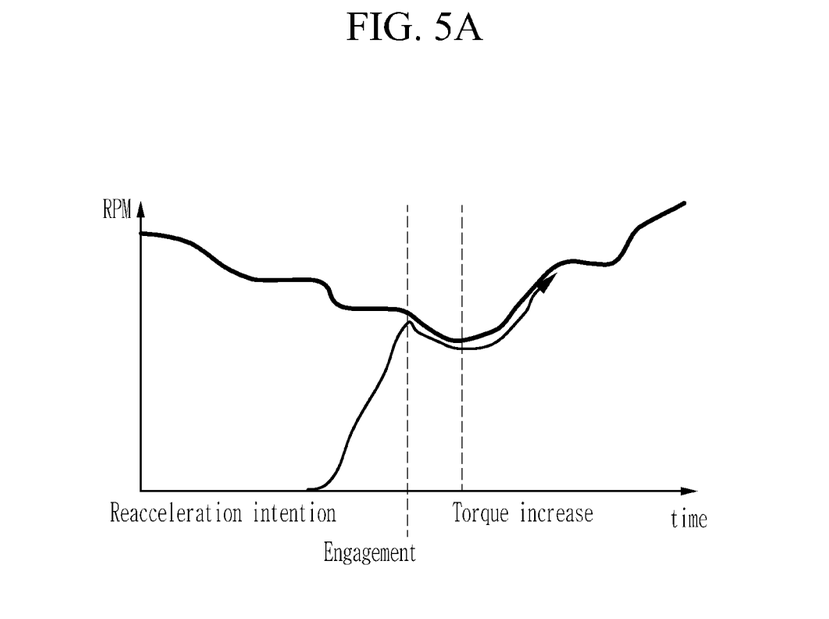
FIGS. 5A-5B are graphs illustrating RPM variations of an MHSG and an engine in a control method of a mild type hybrid electric vehicle according to an exemplary embodiment of the present invention.
Figure 5B:
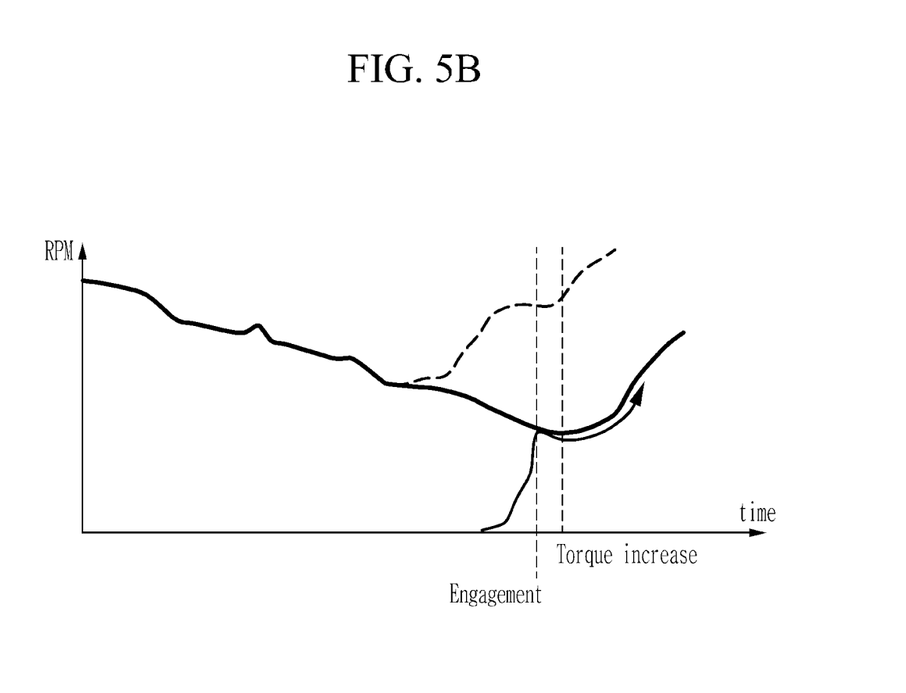

FIGS. 5A-5B are graphs qualitatively illustrating an aspect of controlling the RPM of an engine and the RPM of the MHSG as a control method of a mild hybrid electric vehicle an exemplary embodiment of the present invention described with reference to FIG. 3. As shown in FIG. 5A, when the mild type hybrid electric vehicle according to an exemplary embodiment of the present invention starts a coasting, the RPM of the engine is gradually reduced.

When the reacceleration intention of the driver is detected, the controller 100 may be configured to increase a torque of the MHSG 30 to increase a RPM of the MHSG to a value corresponding to the RPM of the engine. When the RPM of the MHSG becomes the RPM of the engine, the controller 100 may be configured to synchronize the torque of the MHSG with the RPM of the engine for the predetermined time so that the RPM of the engine has the same value as the torque of the MHSG to be reduced according to reduction of the RPM of the engine. When the predetermined period of time elapses and the MHSG is successfully engaged with the engine, the controller may be configured to increase the torque of the MHSG and inject the fuel to the engine, to thus perform reacceleration of the vehicle, and the torque of the MHSG may become a desired torque of the driver by combustion of the engine and the torque assistant of the MHSG. As shown in FIG. 5B, when an initial engagement attempt fails, the controller may be configured to operate the MHSG to reattempt engagement and synchronization.

Figure 6A:
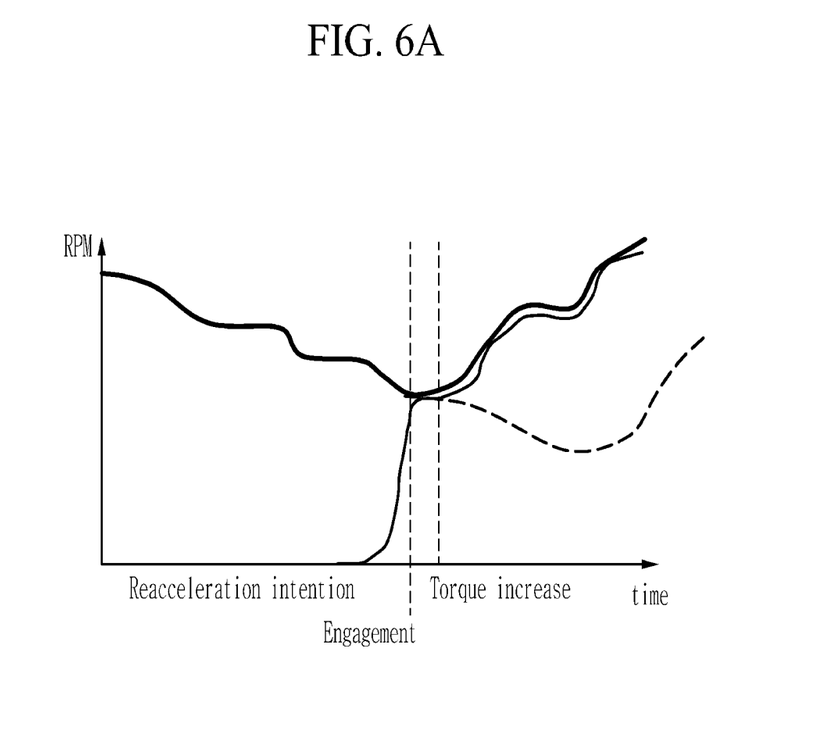
FIGS. 6A-6B are graphs illustrating RPM variations of an MHSG and an engine in a control method of a mild type hybrid electric vehicle according to an exemplary embodiment of the present invention.
Figure 6B:
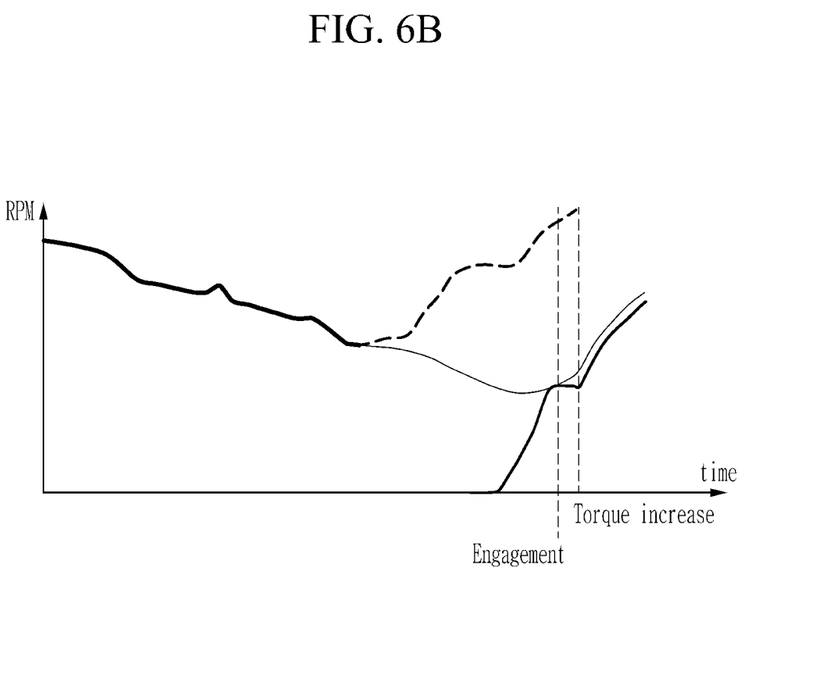

FIGS. 6A-6B are graphs qualitatively illustrating an aspect of adjusting the RPM of an engine and the RPM of the MHSG as a control method of a mild hybrid electric vehicle an exemplary embodiment of the present invention described with reference to FIG. 4A and FIG. 4B. As shown in FIG. 6A, when the mild type hybrid electric vehicle according to an exemplary embodiment of the present invention starts coasting, the RPM of the engine is gradually reduced.

When the reacceleration intention of the driver is detected, the controller may be configured to inject a minimal amount of fuel to the engine to maintain the RPM of the engine within a constant range, and increase a torque of the MHSG to increase a RPM of the MHSG to a value corresponding to the RPM of the engine. When the RPM of the MHSG becomes the RPM of the engine, the controller may be configured to synchronize the RPM of the MHSG with the RPM of the engine for a predetermined period of time so that the RPM of the MHSG is the same as that of the engine to be maintained in a constant range since the RPM of the engine is maintained within a constant range. When the MHSG is successfully engaged with the engine after the predetermined period of time elapses, the controller may be configured to increase the torque of the MHSG and inject the fuel to the engine. Accordingly, the reacceleration of the vehicle may be achieved, and the torque of the MHSG may become a desired torque of the driver by combustion of the engine and the auxiliary torque of the MHSG.

As shown in FIG. 6B, when an initial engagement attempt fails, the controller may be configured to stop injection of the fuel and operate the MHSG to reattempt engagement and synchronization. Accordingly, in an exemplary embodiment of the present invention, when the driver attempts reacceleration during the coasting of the mild type hybrid electric vehicle, the controller may be configured to synchronize the RPM of the MHSG 30 with the RPM of the engine 10 for a predetermined period of time before reacceleration after completion of the engagement of the MHSG with the engine so that the engine RPM may be increased to prevent a rapid variation of RPM during the reacceleration to thus provide a more stable and convenient running feeling to the driver. Further, since the engagement between the MHSG 30 and the engine 10 is performed while maintaining the synchronization of the MHSG 30 with the engine 10, the engagement may be performed more easily.

While this invention has been described in connection with what is presently considered to be practical exemplary embodiments, it is to be understood that the invention is not limited to the disclosed exemplary embodiments, but, on the contrary, is intended to cover various modifications and equivalent arrangements included within the spirit and scope of the appended claims.

DESCRIPTION OF SYMBOLS

10: engine
20: transmission
30: MHSG
40: first battery
50: LDC
60: second battery
70: vehicle electronic device
80: differential gear device
90: wheel
100: controller

What is claimed is:

1. A control method for a mild type hybrid electric vehicle, comprising: determining, by a controller, whether a coasting condition is satisfied; initiating, by the controller, coasting when the coasting condition is satisfied; detecting, by the controller, a reacceleration intention; increasing, by the controller, a torque of a mild hybrid starter & generator (MHSG) when the reacceleration intention is detected; comparing, by the controller, a revolutions per minute (RPM) of the MHSG with an RPM of an engine; attempting, by the controller, an engagement of the MHSG with the engine when the RPM of the MHSG corresponds to the RPM of the engine; determining, by the controller, whether the MHSG is successfully engaged with the engine; and increasing, by the controller, the torque of the MHSG to inject a fuel to the engine when the MHSG is successfully engaged with the engine.

2. The control method for the mild type hybrid electric vehicle of claim 1, wherein: the attempting the engagement of the MHSG with the engine includes synchronizing, by the controller, the RPM of the MHSG with the RPM of the engine; and the synchronizing of the RPM of the MHSG with the RPM of the engine includes adjusting, by the controller, the torque of the MHSG for a predetermined period of time so that the RPM of the MHSG is the same as the RPM of the engine as the RPM of the engine is reduced during coasting.

3. The control method for the mild type hybrid electric vehicle of claim 1, further comprising: adjusting, by the controller, the torque of the MHSG so that the RPM of the MHSG becomes the RPM of the engine when the engagement of the MHSG with the engine fails, wherein when the RPM of the MHSG corresponds to the RPM of the engine, the attempting of the engagement of the MHSG with the engine is repeated.

4. The control method for the mild type hybrid electric vehicle of claim 1, further comprising: comparing, by the controller, the RPM of the engine with a predetermined RPM when the reacceleration intention detected, wherein the increasing of the torque of the MHSG is performed when the RPM of the engine is less than the predetermined RPM.

5. The control method for the mild type hybrid electric vehicle of claim 4, further comprising: initiating, by the controller, the injection of the fuel to the engine to adjust a variation rate of the RPM of the engine to be less than or equal to a predetermined variation rate when the RPM of the engine is equal to or greater than the predetermined RPM.

6. The control method for the mild type hybrid electric vehicle of claim 5, wherein: the attempting the engagement of the MHSG with the engine includes synchronizing, by the controller, the RPM of the MHSG with the RPM of the engine; and the synchronizing of the RPM of the MHSG with the RPM of the engine includes adjusting, by the controller, the torque of the MHSG for a predetermined period of time so that the RPM of the MHSG is the same as the RPM of the engine when the variation rate of the RPM of the engine is less than or equal to the predetermined variation rate due to the injection of the fuel.

7. The control method for the mild type hybrid electric vehicle of claim 5, further comprising: stopping, by the controller, the injection of the fuel to the engine when the engagement of the MHSG with the engine fails; and adjusting, by the controller, the torque of the MHSG so that the RPM of the MHSG becomes the RPM of the engine, wherein when the RPM of the MHSG corresponds to the RPM of the engine, the attempting of the engagement of the MHSG with the engine is repeating.

8. The control method for the mild type hybrid electric vehicle of claim 7, wherein the synchronizing of the RPM of the MHSG with the RPM of the engine includes: adjusting, by the controller, the torque of the MHSG for a predetermined period of time so that the RPM of the MHSG is the same as the RPM of the engine as the RPM of the engine is reduced during coasting.

9. The control method for the mild type hybrid electric vehicle of claim 1, wherein the coasting condition is determined based on at least one of a position value of an accelerator pedal, a position value of a brake pedal, speed of the vehicle, and a gradient of a road, and the initiation of the coasting includes: turning-off the engine and separating the engine and a transmission from a vehicle drive shaft clutch.

10. The control method for the mild type hybrid electric vehicle of claim 1, wherein the reacceleration intention is determined based on a position value of an accelerator pedal and a position value of a shift lever.

11. A control apparatus for a mild type hybrid electric vehicle, comprising: an engine configured to combust a fuel and air; a mild hybrid starter & generator (MHSG) configured to start the engine, generate electricity by an output of the engine, or assist a torque of the engine; a data detector configured to detect data control of the engine and the MHSG; and a controller configured to operate the engine and the MHSG according to the data from the data detector, wherein the controller is configured to: initiate coasting when the coasting condition is satisfied; increase a torque of the MHSG when a reacceleration intention is detected to attempt an engagement of the MHSG with the engine when a revolutions per minute (RPM) of the MHSG corresponds to an RPM of the engine; and increase the torque of the MHSG to inject a fuel to the engine when the MHSG is successfully engaged with the engine.

12. The control apparatus for the mild type hybrid electric vehicle of claim 11, wherein after the engagement of the MHSG with the engine is attempted, the controller is configured to: adjust the torque of the MHSG for a predetermined time so that the RPM of the MHSG is the same as the RPM of the engine as the RPM of the engine is reduced during coasting; and determine whether the MHSG is successfully engaged with the engine after a predetermined period of time elapses.

13. The control apparatus for the mild type hybrid electric vehicle of claim 12, wherein the controller is configured to adjust the torque of the MHSG so that the RPM of the MHSG becomes the RPM of the engine when the engagement of the MHSG with the engine fails, and reattempt the engagement of the MHSG with the engine.

14. The control apparatus for the mild type hybrid electric vehicle of claim 11, wherein the controller is configured to: compare the RPM of the engine with a predetermined RPM when the reacceleration intention is detected during coasting; and increase the torque of the MHSG when the RPM of the engine is less than or equal to the predetermined RPM to attempt the engagement of the MHSG with the engine after the RPM of the MHSG corresponds to the RPM of the engine.

15. The control apparatus for the mild type hybrid electric vehicle of claim 14, wherein the controller is configured to; initiate the injection of the fuel to the engine to adjust a variation rate of the RPM of the engine to be less than or equal to a predetermined variation rate when the RPM of the engine is equal to or greater than the predetermined RPM; and increase the torque of the MHSG to attempt the engagement of the MHSG with the engine after the RPM of the MHSG corresponds to the RPM of the engine.

16. The control apparatus for the mild type hybrid electric vehicle of claim 15, wherein the controller is configured to: adjust the torque of the MHSG for a predetermined time so that the RPM of the MHSG is the same as the RPM of the engine when the variation rate of the RPM of the engine is less than or equal to the predetermined variation rate due to the injection of the fuel.

17. The control apparatus for the mild type hybrid electric vehicle of claim 15, wherein the controller is configured to: stop the injection of the fuel to the engine when the engagement of the MHSG with the engine fans; adjust the torque of the MHSG so that the RPM of the MHSG becomes the RPM of the engine; and attempt the engagement of the MHSG with the engine.

18. The control apparatus for the mild type hybrid electric vehicle of claim 17, wherein the controller is configured to: adjust the torque of the MHSG for a predetermined time so that the RPM of the MHSG is the same as the RPM of the engine as the RPM of the engine is reduced during coasting after attempting the engagement of the MHSG with the engine.

19. The control apparatus for the mild type hybrid electric vehicle of claim 11, wherein the controller is configured to: determine whether the coasting condition is satisfied based on at least one of a position value of an accelerator pedal, a position value of a brake pedal, speed of the vehicle, and a gradient of a road; and turn-off the engine when the coasting condition is satisfied, and separate the engine and a transmission from a vehicle drive shaft clutch to start the coasting.

20. The control apparatus for the mild type hybrid electric vehicle of claim 11, wherein the controller is configured to: detect the reacceleration intention based on a position value of an accelerator pedal and a position value of a shift lever.

* * * * *